United States Patent
Harrison et al.

(10) Patent No.: US 9,239,983 B1
(45) Date of Patent: Jan. 19, 2016

(54) QUANTIFYING A CONDITION WITH A NEURAL NETWORK

(75) Inventors: Gregory A. Harrison, Oviedo, FL (US);
Sreerupa Das, Oviedo, FL (US);
Michael A. Bodkin, Orlando, FL (US);
Richard M. Hall, Orlando, FL (US);
Eric W. Worden, Orlando, FL (US);
Stefan Herzog, Jr., Casselberry, FL (US)

(73) Assignee: Lockheed Martin Corporation, Bethesda, MD (US)

(*) Notice: Subject to any disclaimer, the term of this patent is extended or adjusted under 35 U.S.C. 154(b) by 575 days.

(21) Appl. No.: 13/434,072

(22) Filed: Mar. 29, 2012

Related U.S. Application Data (60) Provisional application No. 61/530,629, filed on Sep. 2, 2011.

(51) Int. Cl.
 *G06N 5/02* (2006.01)
 *G06N 3/04* (2006.01)

(52) U.S. Cl.
 CPC ......................... *G06N 3/04* (2013.01)

(58) Field of Classification Search
 None
 See application file for complete search history.

(56) References Cited

U.S. PATENT DOCUMENTS

| | | | |
|---|---|---|---|
| 6,301,572 B1 | 10/2001 | Harrison | |
| 7,277,823 B2 | 10/2007 | Harrison et al. | |
| 7,478,013 B2 | 1/2009 | Harrison et al. | |
| 7,734,443 B2 | 6/2010 | De et al. | |
| 7,797,062 B2 | 9/2010 | Discenzo et al. | |
| 8,082,115 B2 | 12/2011 | Bechhoefer et al. | |
| 8,285,438 B2 | 10/2012 | Mylaraswamy et al. | |
| 2011/0043536 A1 | 2/2011 | Cobb et al. | |
| 2011/0167024 A1 | 7/2011 | Diaz et al. | |

OTHER PUBLICATIONS

Klesk, Przemyslaw, "Construction of a Neurofuzzy Network Capable of Extrapolating (and Interpolating) with Respect to the Convex Hull of a Set of Input Samples in $\mathbb{R}$ n", Fuzzy Systems, IEEE Transactions on (vol.16 , Issue: 5 ), Oct. 2008, pp. 1161-1179.*
zabela Rejer and Marek Mikolajczyk, "A Hypertube as a Possible Interpolation Region of a Neural Model", from Rutkowski et al. (Eds.): ICAISC 2006, LNAI 4029, pp. 123-132, 2006, copyright held by Springer-Verlag Berlin Heidelberg 2006.*
Karakowski and Phu, "A Fuzzy Hypercube Artificial Neural Network Classifier", Research and Development Technical Report CECOM-TR-98-4, U. S. Army Communications-Electronics Command, Research, Development and Engineering Center, Fort Monmouth, New Jersey, Oct. 1998, pp. 1-40.*

(Continued)

*Primary Examiner* — Kakali Chaki
*Assistant Examiner* — Walter Hanchak
(74) *Attorney, Agent, or Firm* — Withrow & Terranova, PLLC (57) ABSTRACT

Quantification of a condition of a selected item using a neural network is disclosed. A device defines a good hypertube in a neural state space based on good item state points obtained from one or more items that exhibit desired operating characteristics, and a bad hypertube in the neural state space based on bad item state points obtained from one or more items that exhibit undesirable operating characteristics. A current item state hyperpoint is determined in the neural state space based on a current item state point of the selected item. A condition of the selected item is quantified as a function of a location of the current item state hyperpoint with respect to at least a portion of the good hypertube and with respect to at least a portion of the bad hypertube.

18 Claims, 7 Drawing Sheets

(56) References Cited

OTHER PUBLICATIONS

Tom G. Reynolds & R. John Hansman, "Analysis of Separation Minima Using a Surveillance State Vector Approach", Proceedings of 3rd USA/Europe Air Traffic Management R&D Seminar, Napoli, Jun. 13-16, 2000, pp. 1-10.*
Xu and Wunsch, "Clustering", John C. Wiley and Sons, Oxford, 2009, Section Chapter 5 , pp. 111-162.*
Klesk, Przemyslaw, "Construction of a Neurofuzzy Network Capable of Extrapolating (and Interpolating) with Respect to the Convex Hull of a Set of Input Samples in $\mathbb{R}$ n", Fuzzy Systems, IEEE Transactions on (vol. 16 , Issue: 5 ), Oct. 2008, pp. 1161-1179.*
Izabela Rejer and Marek Mikolajczyk, "A Hypertube as a Possible Interpolation Region of a Neural Model", from Rutkowski et al. (Eds.): ICAISC 2006, LNAI 4029, pp. 123-132, 2006, copyright held by Springer-Verlag Berlin Heidelberg 2006.*
D. Watola, J. B. Hampshire II, "Automated Downlink Analysis for the Deep Space Network", NASA TDA Progress Report 42-126, "http://ipnpr.jpl.nasa.gov/progress_report/42-126/126F.pdf", Aug. 15, 1996, pp. 1-19.*
Abbas, M. et al., "A hierarchical framework for fault propagation analysis in complex systems," AUTOESTCON, 2009, 6 pages.
Budde, C. et al., "Impact damage detection for fiberglass composite rotor blade," Proceedings of the Annual Forum of the American Helicopter Society, May 2009, 11 pages.
Carpenter, G.A. et al., "Fuzzy ART: fast stable learning and categorization of analog patterns by an adaptive resonance system," Neural Networks, vol. 4, 1991, pp. 759-771.
Chung, Y. et al., "Application of phase detection frequency domain reflectometry for locating faults in an F-18 flight control harness, IEEE Transactions on Electromagnetic Compatibility," vol. 42, No. 2, 2005, pp. 327-334.
Department of Defense, "Condition based maintenance plus (CBM+) for materiel maintenance," No. 4151.22, Dec. 2, 2007, 11 pages.
Deriche, M. "Bearing fault diagnosis using wavelet analysis," Computers, Communication & Signal Processing Conference, 2005, pp. 197-201.
Friswell et al., "Crack identification in rotating machines with active bearings," Proceedings of the ISMA, 2010, pp. 2843-2855.
Hale, B., "An alternative vision for CBM+ for the Air Force," Air Force Journal of Logistics, Jun. 2005.
Harrison, G. A. et al., "CBM+ system for ship condition monitoring," Fourteenth International Ship Control Systems Symposium, Ottawa, Canada, Sep. 21-23, 2009, 10 pages.
Hochmann, D. et al., "Envelop bearing analysis: theory and practice," Aerospace Conference, 2005, pp. 3658-3666.
Jaw. L.C. et al., "CBM+ research environment—facilitating technology development, experimentation, and maturation," IEEE Aerospace Conference, 2008, 6 pages.
Karakowski, J. et al., "A fuzzy hypercube artificial neural network classifier," Research and Development Technical Report CECOM-TR-98-4, U.S. Army Communcations-Electronics Command, Oct. 1998, 47 pages.
Kautz, W.H., "Testing for faults in wiring networks, IEEE Transactions on Computers," vol. C-23, Iss. 4, 1974, pp. 358-363.
Kohonen, T., "Self-Organizing Feature Maps," in Self-Organization and Associative Memory, New York, Springer-Verlag, 1988, pp. 119-157.
Lebold, M. et al., "Review of vibration analysis methods for gearbox diagnostics and prognostics," Proceedings of the 53rd meeting of the Society for Machinery Failure Prevention Technology, May 14, 2000, pp. 623-634.
Schubert, L. et al., "Structural health monitoring of a rotor blade during statical load test," 18th International Conference on Database and Expert Systems Applications, 2007, pp. 297-301.
Wan, S. et al., "The fault diagnosis method of rolling bearing based on wavelet packet transform and zooming envelop analysis," International Conference on Pattern Recognition, vol. 3, 2007, pp. 1257-1261.
U.S. Army, "CBM+ Roadmap," Dec. 13, 2007, 88 pages.
Notice of Allowance and Interview Summary for U.S. Appl. No. 13/472,547, mailed Feb. 20, 2015, 18 pages.
Non-Final Office Action for U.S. Appl. No. 13/472,547, mailed Aug. 15, 2014, 21 pages.
Notice of Allowance for U.S. Appl. No. 13/591,697, mailed Jul. 22, 2014, 10 pages.

* cited by examiner

QUANTIFYING A CONDITION WITH A NEURAL NETWORK

RELATED APPLICATIONS

This application claims the benefit of U.S. provisional patent application No. 61/530,629, filed Sep. 2, 2011, the disclosure of which is hereby incorporated herein by reference in its entirety.

FIELD OF THE DISCLOSURE

The present disclosure relates generally to determining a condition of an item, and in particular to quantifying a condition of an item using a neural network.

BACKGROUND

Many large-scale distributed organizations, such as package delivery services, airlines, and the military, need to continually maintain relatively complex machines. Increasingly, machines are being equipped with sensors that sense and measure various attributes of the machines, such as temperature, oil pressure, vibrations, and the like. Humans can analyze such data and then make determinations regarding the condition of the machine. However, such analyses can be very complicated, time-consuming, and expensive.

SUMMARY

The present disclosure relates to the use of a neural network to quantify a condition of an item. In one embodiment, a good hypertube is defined in a neural state space based on a plurality of good item state points of at least one good item that exhibits desired operating conditions. Each good item state point is based on one or more sensed attribute values of one or more sensed attributes of the at least one good item. The sensed attributes can comprise any characteristic of an item that can be sensed and measured. In the context of a machine, for example, sensed attributes may comprise a temperature, a vibration level or frequency, a sound level, a stress level, and the like. A bad hypertube is defined in the neural state space based on a plurality of bad item state points of at least one bad item that exhibits undesirable operating characteristics. The good and bad hypertubes are defined based on sensed attribute values obtained over a period of time. In one embodiment, the good and bad hypertubes may be defined during a training phase, wherein the neural network accesses historical data that comprises sensed attribute values from both the good item and the bad item.

A current item state hyperpoint in the neural state space is determined based on a current item state point of the selected item. A condition of the item is then quantified as a function of a location of the current item state hyperpoint with respect to at least a portion of the good hypertube and with respect to at least a portion of the bad hypertube. A location of the current item state hyperpoint that is closer to the good hypertube indicates a more desirable condition of the selected item than a location that is closer to the bad hypertube.

In one embodiment, the good hypertube includes a plurality of good hypercubes. Each good hypercube is based on at least one good item state hyperpoint. The bad hypertube includes a plurality of bad hypercubes. Each bad hypercube is based on at least one bad item state hyperpoint.

The condition of the item may be quantified based on the location of the current item state hyperpoint with respect to a first set of good hypercubes and with respect to a second set of bad hypercubes. In one embodiment, the first set of good hypercubes may comprise all good hypercubes in the good hypertube and the second set of bad hypercubes may comprise all bad hypercubes in the bad hypertube. In another embodiment, the first set of good hypercubes may comprise all good hypercubes within a particular hyperradius of the location of the current item state hyperpoint, and the second set of bad hypercubes may comprise all bad hypercubes within the hyperradius of the location of the current item state hyperpoint.

Hypercubes resonate with respect to a location of a hyperpoint in the neural state space. Hypercubes closer to the location resonate more than hypercubes farther from the location. In one embodiment, the condition of the item may be quantified by determining an aggregate good resonance of the first set of good hypercubes with respect to the location of the current item state hyperpoint, determining an aggregate bad resonance of the second set of bad hypercubes with respect to the location of the current item state hyperpoint, and determining a difference resonance between the aggregate good resonance and the aggregate bad resonance. The difference resonance may be compared to a plurality of different resonance ranges, each resonance range corresponding to a particular condition of a plurality of potential conditions. The condition of the item may then be quantified based on the particular resonance range that the difference resonance falls within.

A visual indicator, or indicia, of the condition of the item may also be provided. For example, a green light may be activated if the difference resonance is determined to be above or below a predetermined threshold, or within a particular resonance range, to indicate that the condition of the item is good, or otherwise desirable. A yellow light may be activated if the difference resonance is within a resonance range that indicates less than an ideal condition, but not an undesirable condition. A red light may be activated if the difference resonance is within a resonance range that indicates an undesirable condition.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

For purposes of illustration, embodiments will be disclosed herein in the context of an item that is a machine, but the present disclosure has wide applicability to items of practically any type, including, but not limited to: financial indicators; processes, such as baking processes or other processes; weather; nuclear power plants; oil refineries; and humans. In particular, the present disclosure has applicability to any item, including a process, that has attributes that can be sensed and quantified, and that has both "good" states and "bad" states. The terms "good" and "bad," as used herein, are intended to distinguish desired characteristics (i.e., good characteristics) from undesirable characteristics (i.e., bad characteristics). What constitutes desirable characteristics as opposed to undesirable characteristics may differ based on the respective items. For example, and not intending to be limiting, what constitutes desirable characteristics as opposed to undesirable characteristics may differ from item type to item type, from environment to environment, from culture to culture, and/or gender to gender. Thus, "good" and "bad" may be item-dependent, but may be unequivocally defined through various metrics, such as temperature ranges, pressure ranges, frequency ranges, or the like.

Figure 1:
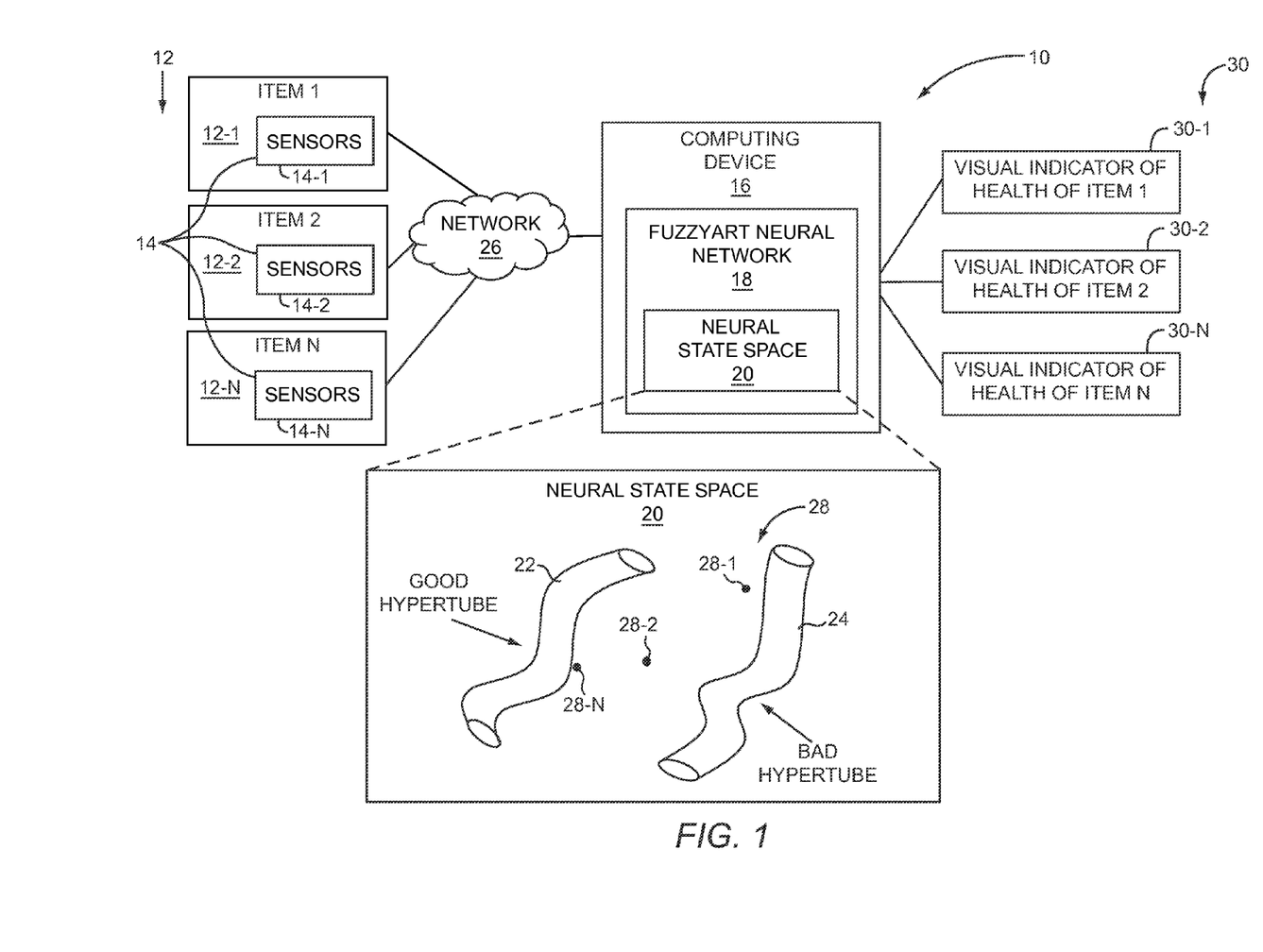
FIG. 1 is a block diagram of an exemplary system in which embodiments of the present disclosure may be practiced.
Figure 2:
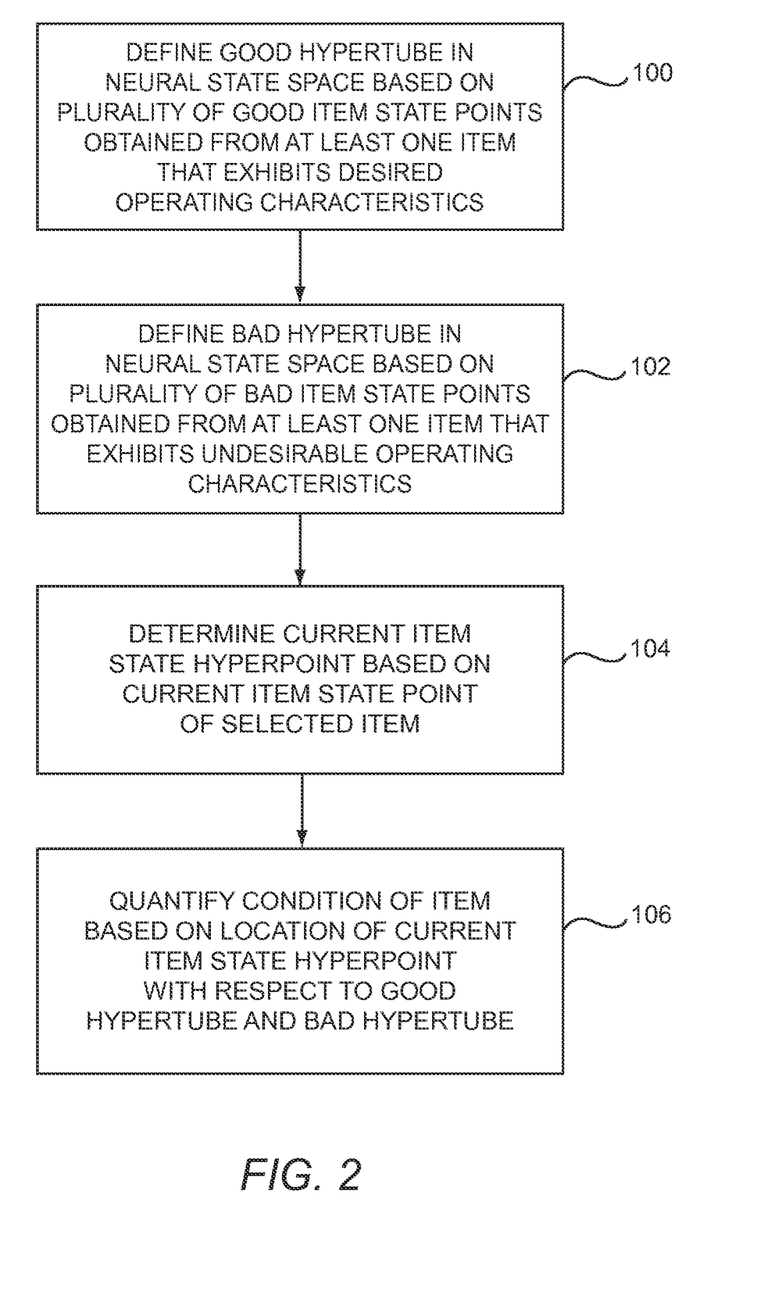
FIG. 2 is flow chart of an exemplary method for quantifying the condition of an item according to one embodiment.

FIG. 1 is a block diagram of an exemplary system 10 in which embodiments of the present disclosure may be practiced. FIG. 2 is flow chart of an exemplary method for quantifying the condition of an item according to one embodiment. FIGS. 1 and 2 will be discussed in conjunction with one another. The system 10 includes one or more items 12-1-12-N (generally, items 12). In this exemplary embodiment, the items 12 are machines, and may comprise any apparatus, vehicle, or other entity, either stationary or mobile, which may be monitored by a sensor. Non-limiting examples of items 12 are automobiles, trucks, planes, boats, motorcycles, helicopters, factory robots, or the like. Each item 12 includes one or more sensors 14-1-14-N (generally, sensors 14) that sense an attribute of the item 12. The sensors 14 may comprise any suitable sensor, such as an accelerometer, dynamometer, charge amp, thermocouple, digital signal processor (DSP), tachometer, or the like. Each sensor 14 senses attributes of the corresponding item 12, such as temperature, frequency, viscosity, sound level, or the like. The sensors 14 generate attribute values, sometimes referred to herein as "sensed attribute values," which quantify the sensed attributes. For example, if the sensed attribute is a temperature, a sensed attribute value may comprise 99° Fahrenheit.

A computing device 16 includes a Fuzzy Adaptive Resonance Theory (FuzzyART) neural network 18 which includes data that defines a neural state space 20. The neural state space 20 includes a good hypertube 22 and a bad hypertube 24. While only a single good hypertube 22 and bad hypertube 24 are shown for purposes of illustration, the neural state space 20 may comprise a plurality of good hypertubes 22 and/or bad hypertubes 24. The good hypertube 22 is defined in the neural state space 20 and was learned based on good item state points obtained from one or more good items of the same item type as an item 12 and that exhibit desired operating characteristics (FIG. 2, step 100). An item state point identifies the state of an item at a point in time and comprises one or more sensed attribute values obtained from the item. For example, if a temperature is being sensed, then the item state point comprises a temperature value. If a temperature and an oil pressure are being sensed, then the item state point comprises a temperature value and an oil pressure reading.

The bad hypertube 24 is defined in the neural state space 20 and was learned based on bad item state points obtained from one or more bad items of the same item type as the items 12 and that exhibit undesirable operating characteristics (FIG. 2, step 102). In one embodiment, the good hypertube 22 and the bad hypertube 24 may be learned item state points obtained from the particular item 12 being monitored.

While the good hypertube 22 and the bad hypertube 24 may be learned based on item state points from a single good item and a single bad item, respectively, it may be preferable to learn the good hypertube 22 and the bad hypertube 24 based on item state points from the performance of multiple good items and multiple bad items, respectively, so a more realistic envelope of acceptable, or desirable, performance and unacceptable, or undesirable, performance, respectively, may be gleaned.

The computing device 16 may be communicatively coupled to the items 12 via one or more networks 26. The network 26 represents any public or private network, or combination thereof, suitable for facilitating data exchange among the various elements discussed herein. While using the network 26 to transfer data, such as item state points, between the items 12 and the computing device 16 may be desirable, it is not necessary for the embodiments of this disclosure, and the transfer of data between the elements may occur via other mechanisms, such as via portable flash drives or the like, or via any other desired or suitable data transfer mechanism.

In one embodiment, the computing device 16 receives a current item state point from a selected item 12, such as a selected item 12-1, via the network 26. Based on the current item state point, the computing device 16 determines a current item state hyperpoint 28-1 that maps the current item state point of the item 12-1 to a location in the neural state space 20 (FIG. 2, step 104). The computing device 16 then quantifies the condition of the item 12-1 based on the location of the current item state hyperpoint 28-1 in the neural state space 20 with respect to the good hypertube 22 and the bad hypertube 24 (FIG. 2, step 106). The computing device 16 may then, for example, present indicia, such as a visual indicator 30-1 (generally, visual indicator 30), on a display that identifies the condition of the item 12-1. For example, a green light may be activated if the condition of the item 12-1 is determined to be good; a yellow light may be activated if the condition of the item 12-1 is determined to be less than preferable, but not undesirable, such as being a neutral condition; and a red light may be activated if the condition of the item 12-1 is determined to be poor. It will be appreciated that the visual indicator 30-1 could comprise any mechanism for illustrating the condition of the item 12-1, such as a bar graph, and is not limited to lights of different colors.

The computing device 16 may similarly determine a current item state hyperpoint 28-2 that maps a current item state point of the item 12-2 to a location in the neural state space 20, and a current item state hyperpoint 28-N that maps the current item state point of the item 12-N to a location in the neural state space 20. Such current item state points, as discussed above, are based on sensed attribute values received from the sensors 14-2 and 14-N, respectively. Based on the current item state hyperpoint 28-2 and current item state hyperpoint 28-N, the computing device 16 can then quantify the condition of the items 12-2 and 12-N, respectively, and depict their condition via visual indicators 30-2, 30-N. Alternatively, or in addition to displaying a visual indicator 30, the condition may be reported up a chain of command, or a system-of-systems hierarchy, for fleet-wide Condition Based Maintenance (CBM) and for fleet aggregate readiness testing for taking on certain tasks.

In one embodiment, a hypertube is not necessarily a continuous surface, but rather is made up of a plurality of hypercubes. Generally, hypercubes aggregate into a volume that represents the hypertube of either good or bad performance. Thus, rather than attempting to wrap a surface around the outside of this volume of hypercubes and obtain an orthogonal distance from the outside of such surface, the use of hypercubes provides better statistical validity by using the components of the volume, i.e., the hypercubes, to individually contribute to the operating quality of the current item state hyperpoint 28. Each hypercube in the neural state space 20 is based on one or more item state hyperpoints. A vigilance parameter in the operation of the neural state space 20 determines the maximum size of a hypercube in the neural state space 20 by defining a threshold by which a new item state hyperpoint must resonate with an existing hypercube in order to allow that item state hyperpoint to be represented by that hypercube. Item state hyperpoints are derived from item state points obtained from items.

Figure 3:
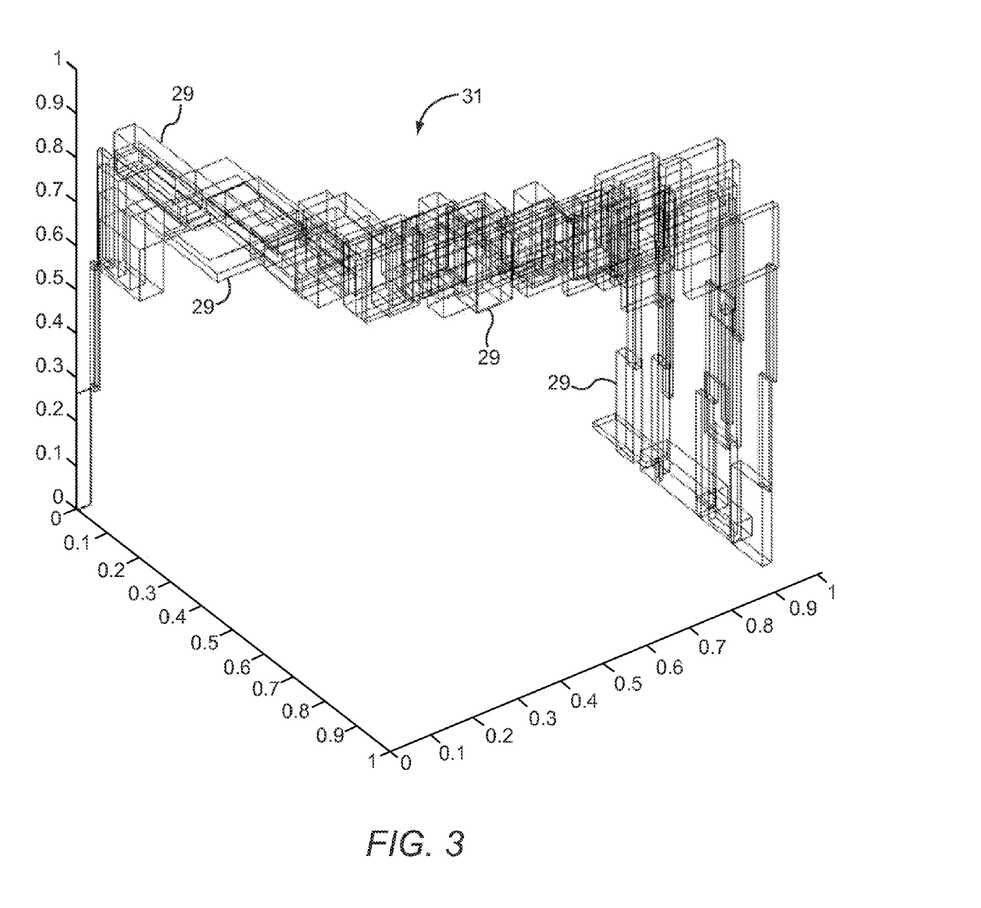
FIG. 3 is a graph that illustrates exemplary hypercubes that form a hypertube in a neural state space.

FIG. 3 is a graph that illustrates exemplary hypercubes 29 that form a hypertube 31 in a neural state space. Each hypercube 29 is defined by, or represents, one or more item state hyperpoints. Each item state hyperpoint is based on an item state point. An item state point comprises one or more sensed attribute values. For example, each item state point may be based on three sensed attribute values, such as, for example, engine speed, fuel delivery pressure, and engine oil pressure. Where a hypercube represents multiple item state hyperpoints, one of the item state hyperpoints defines a lower corner of the hypercube and another of the item state hyperpoints defines an upper corner of the hypercube. The hypercubes 29 are generated over a period of time from a plurality of sensed attributes from multiple items of the same item type. Assume that the items from which the attributes were sensed exhibited desired operating characteristics. In this example, therefore, the hypercubes 29 may form what is referred to herein as a "good" hypertube 31.

Defining the good hypertube 22 and the bad hypertube 24 in the neural state space 20 (FIG. 1) may be done previously to and independently of the quantification of the condition of an item 12. For example, the computing device 16 may access good item state points during a training phase over an extended period of time from a first set of items of the same item type as the items 12 that exhibit desired operating conditions, and thereby may define the good hypertube 22 in the neural state space 20 based on the sensed attributes via the learning mechanism of FuzzyART. The computing device 16 may also access bad item state points during the training phase over the extended period of time from a second set of items of the same item type as the items 12 that exhibit undesirable operating conditions, and thereby may define the bad hypertube 24 in the neural state space 20 based on the sensed attributes. The good and bad item state points may be prerecorded. It will be appreciated that an item at one point in time may be in the first set of items, and may subsequently begin exhibiting undesirable characteristics, and therefore be included in the second set of items at a second point in time.

An example of translating, or mapping, item state points obtained from an item into item state hyperpoints at locations in neural state space 20 will now be discussed. A neural state space 20 may comprise any number of dimensions, each dimension corresponding to a particular sensed attribute. In this example, assume that the neural state space 20 comprises three dimensions: a first dimension of temperature, a second dimension of frequency, and a third dimension of pressure. The computing device 16 receives, therefore, three sensed attribute values: a temperature, a frequency, and a pressure. The computing device 16 then constructs an input vector I in the following manner:

$$I=[I_1,I_2,I_3,I_1^c,I_2^c,I_3^c] \quad (1)$$

wherein the subscript (i.e., 1, 2, 3) is the input dimension. For instance, dimension $I_1$ is a temperature where the range [0 ... 1] represents [−32° F. ... 200° F.], using normalization to fit the actual temperature range into a reduced [0 ... 1] representation for use in the neural state space 20. The c superscript represents a "complement-encoded" value. The use of complement-encoded values helps make hypercube creation stable across the entire neural state space 20. A complement-encoded portion of the input vector I has the form:

$$I_1^c=1-I_1 \quad (2)$$

such that if the normalized values associated with three sensed attributes are, for example:

$I_1=0.4; I_2=0.3; I_3=0.5$ then $$I=[0.4,0.3,0.5,0.6,0.7,0.5] \quad (3)$$

and I represents an item state hyperpoint in the neural state space 20, and comprises a multi-dimensional vector, each dimension of which characterizes a particular sensed attribute value (or its complement) of a corresponding item at an instant in time.

In a similar fashion, a w prototype vector represents a learned hypercube, and also uses complement encoding, but instead of using just a single item state hyperpoint, the w prototype vector can encode a plurality of item state hyperpoints to thereby represent a hypercube. The w prototype vector includes two parts, a lower corner and an upper corner that has been complement-encoded. The lower corner is represented by the vector u, and the upper corner is represented by the vector v, and w is:

$$w=[u,v^c] \quad (4)$$

In the case of a three-dimensional prototype, as discussed above, the components of equation 4 become $$w=[u_1,u_2,u_3,v_1^c,v_2^c,v_3^c]=[u_1,u_2,u_3,1-v_1,1-v_2,1-v_3] \quad (5)$$

For example, if the lower corner u is at [0.1, 0.2, 0.3], and the upper corner v is at [0.2, 0.3, 0.4], then the prototype encoding will be $$w=[0.1,0.2,0.3,0.8,0.7,0.6] \quad (6)$$

Figure 4:
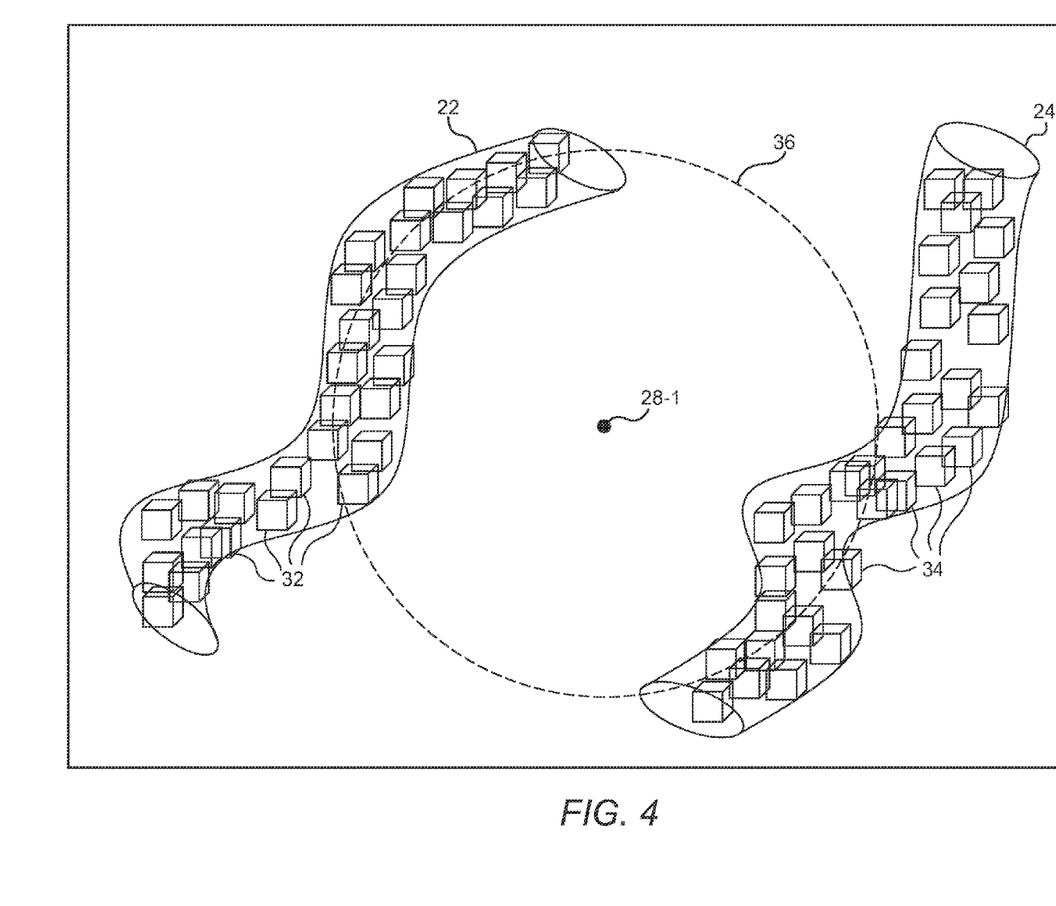
FIG. 4 is a diagram of the neural state space illustrated in FIG. 1, depicting a plurality of good hypercubes and a plurality of bad hypercubes that make up the good hypertube and the bad hypertube illustrated in FIG. 1, respectively.

FIG. 4 is a diagram of the neural state space 20 illustrated in FIG. 1, depicting a plurality of good hypercubes 32 and a plurality of bad hypercubes 34 that make up the good hypertube 22 and the bad hypertube 24, respectively. In one embodiment, the computing device 16 quantifies the condition of a machine, such as the item 12-1, as a function of the location of the current item state hyperpoint 28-1 with respect to a first set of good hypercubes 32 and a second set of bad hypercubes 34. The first set of good hypercubes 32 could include, in one embodiment, each good hypercube 32 in the good hypertube 22, and the set of bad hypercubes 34 could include each bad hypercube 34 in the bad hypertube 24. In another embodiment, a hyperradius 36 is determined. The set of good hypercubes 32 may be all the good hypercubes 32 that are within the hyperradius 36 of the current item state hyperpoint 28-1, and the set of bad hypercubes 34 could be all the bad hypercubes 34 that are within the hyperradius 36. It will be appreciated that other mechanisms could be used to select the set of good hypercubes 32 and the set of bad hypercubes 34. The hyperradius 36 may be determined in any desirable manner. For example, the hyperradius 36 may be predetermined or preconfigured. The hyperradius 36 may be determined experimentally over time, or the like.

An item state hyperpoint, such as the current item state hyperpoint 28-1, has a resonance with various hypercubes 32, 34 in the neural state space 20. The concept of resonance may be stated mathematically as:

$$R_j = \frac{|I \wedge w|}{M}$$

where I is the complement-encoded representation of the input vector of sensed attributes from a machine, such as the item 12-1, as discussed above with regard to equations 1-3, the symbol ^ represents the fuzzy min operation, w is the numerical representation of a given hypercube, as discussed above with regard to equations 4-6, and M is the dimensionality of the hypercube. As M is a constant, in this example three, it may be discarded, since all the hypercubes 32, 34 have the same dimensionality, resulting in $$R_j = |I \wedge w| \tag{7}$$

Taking the L1 norm is accomplished in the following manner:

$$|x| \equiv \sum_{j=1}^{M} |x_j| \tag{8}$$

for a vector x of dimension M. The fuzzy min operation is defined as $$a \char`\^ b = \min(a,b) \tag{9}$$

Therefore, the resonance $R_j$ of hypercube j to the input point I, as shown in equation 7, for a three-dimensional space is $$R_j = |I \wedge w| = |I_1 \wedge u_1, I_2 \wedge u_2, I_3 \wedge u_3, I_1^c \wedge v_1^c, I_2^c \wedge v_2^c, I_3^c \wedge v_3^c| = \min(I_1, u_1) + \min(I_2, u_2) + \min(I_3, u_3) + \min(1-I_1, 1-u_1) + \min(1-I_2, 1-u_2) \min(1-I_3, 1-u_3). \tag{10}$$

For the given example above with regard to equations 1-6, the resonance $R_j$ may be calculated as:

$$R_j = \min(0.4,0.1) + \min(0.3,0.2) + \min(0.5,0.3) + \min(0.6, 0.8) + \min(0.7,0.7) \min(0.5,0.6) = 0.1 + 0.2 + 0.3 + 0.6 + 0.7 + 0.5 = 2.4$$

Figure 5:
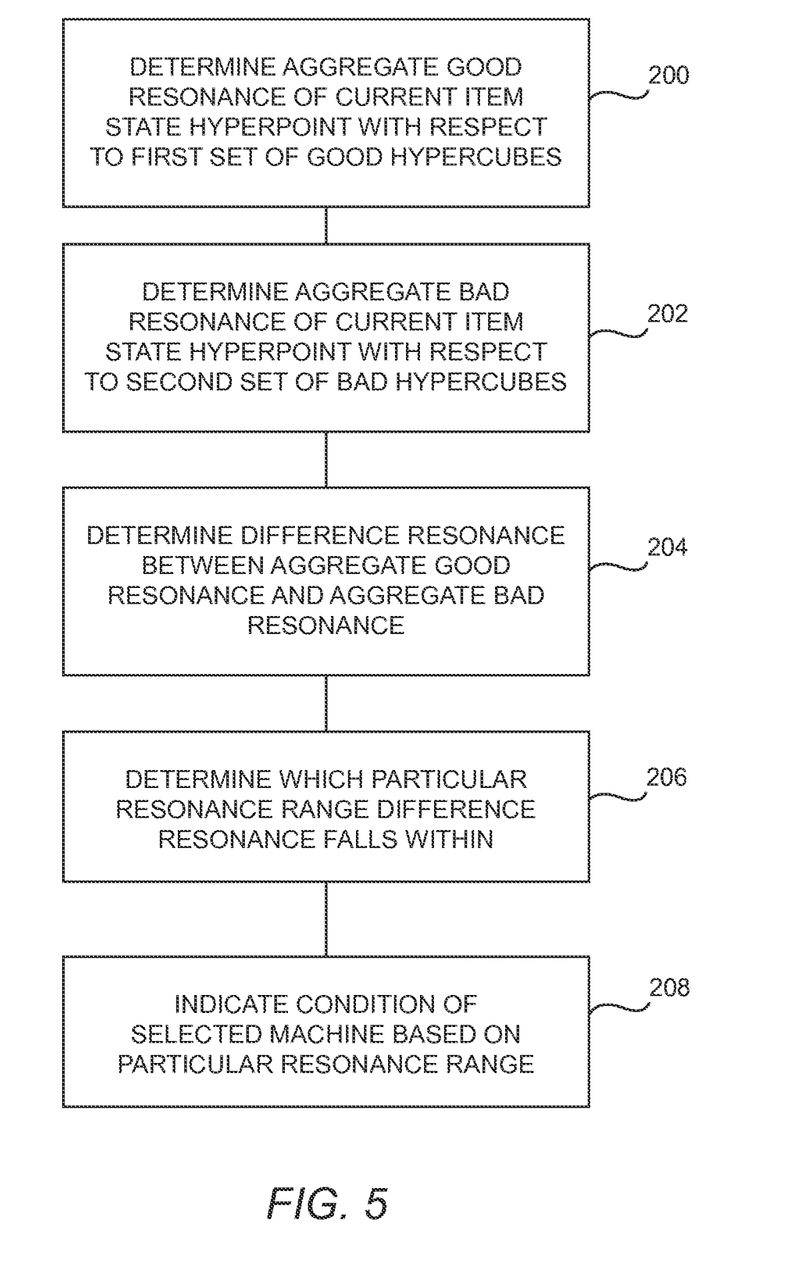
FIG. 5 is a flowchart illustrating an exemplary method for quantifying the condition of an item as a function of the location of a current item state hyperpoint with respect to a first set of good hypercubes and with respect to a second set of bad hypercubes.

FIG. 5 is a flowchart illustrating an exemplary method for quantifying a condition of an item 12-1 as a function of the location of a current item state hyperpoint 28-1 with respect to the first set of good hypercubes 32 and with respect to the second set of bad hypercubes 34. FIG. 5 will be discussed in conjunction with FIG. 4. In this embodiment, the computing device 16 determines an aggregate good resonance for the current item state hyperpoint 28-1 with respect to the first set of good hypercubes 32 by summing the resonances of each good hypercube 32 in the first set of good hypercubes 32 with respect to the current item state hyperpoint 28-1 (FIG. 5, step 200). The computing device 16 also determines an aggregate bad resonance for the current item state hyperpoint 28-1 with respect to the second set of bad hypercubes 34 by summing the resonances of each bad hypercube 34 in the second set of bad hypercubes 34 with respect to the current item state hyperpoint 28-1 (FIG. 5, step 202).

The computing device 16 then subtracts the aggregate bad resonance from the aggregate good resonance to determine a difference resonance (FIG. 5, step 204).

The good resonances are represented below in equation 11 as $R_j^G$, where $j \in \mathcal{G}$, and $\mathcal{G}$ is the set of good hypercubes 32 in proximity to the current item state hyperpoint 28-1 (represented as I in the equations herein). As discussed above, $\mathcal{G}$, the set of good hypercubes 32, can be defined in a number of different ways, including, for example, all good hypercubes 32, or only those good hypercubes 32 within a hyperradius 36 of the current item state hyperpoint 28-1. Similarly, the set of bad hypercubes 34 is represented below as $\mathcal{B}$, and the bad resonances are represented as $R_i^B$, where $i \in \mathcal{B}$. This allows the difference resonance, $R_j^T$, for a given current item state hyperpoint 28 to be calculated as:

$$R_j^T = A_G \sum_{j \in \mathcal{G}} R_j^G - A_B \sum_{i \in \mathcal{B}} R_i^B \tag{11}$$

where $A_G$ and $A_B$ are adjustments to provide a more balanced representation in cases where there are more good hypercubes 32 than bad hypercubes 34, for example. Such adjustments can be calculated as:

$$A_G = 1/n(\mathcal{G}) \tag{12a}$$

$$A_B = 1/n(\mathcal{B}) \tag{12b}$$

where n(•) indicates the number of elements in the set of good hypercubes 32 and bad hypercubes 34, respectively.

Based on the difference resonance, the computing device 16 may quantify the condition of the item 12-1 in any of a number of different ways. In one embodiment, a plurality of resonance ranges may be defined and the computing device 16 may determine which resonance range the difference resonance falls within (FIG. 5, step 206). The computing device 16 may then activate the visual indicator 30-1 based on the particular resonance range (FIG. 5, step 208). For example, a first resonance range may indicate an item 12-1 in a good condition, a second resonance range may indicate a less than desirable but not undesirable condition of the item 12-1, and a third resonance range may indicate an item 12-1 in an undesirable condition. The visual indicator 30-1 may, as discussed above, reflect such condition via any number of different characteristics, such as by using different colors of light emitting diodes (LEDs) based on the particular resonance range. In one embodiment, the item 12-1 may be constantly monitored such that the computing device 16 continually and iteratively quantifies the condition of the item 12-1 based on new sensed attributes. Accordingly, over a period of time, the visual indicator 30-1 may vary from indicating a good condition, to a less than optimal condition, and finally, if no action is taken, to a poor condition. The visual indicator 30-1 may have any number of variations ranging from an ideal condition to a poor condition based on a preferred granularity.

It should be apparent that other forms of the equations 11 and 12a, 12b may be used to quantify the condition of the item 12-1. Preferably, however, the resonances of the first and second sets of good and bad hypercubes 32, 34 are compared to each other in some equation, such as the differencing equation illustrated in equation 11, such that the good and bad hypercubes 32, 34 are joined together automatically.

Figure 6:
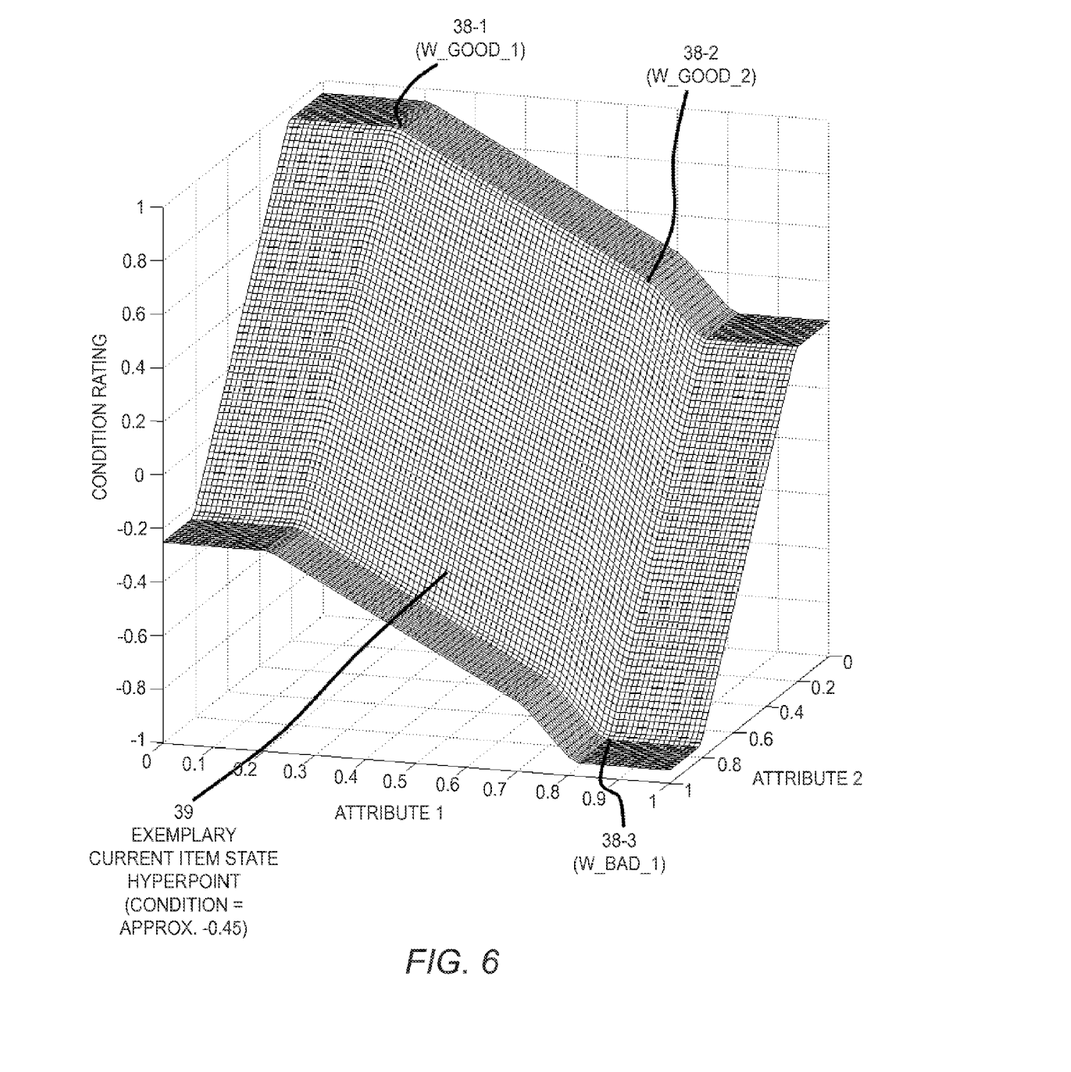
FIG. 6 is a graph that illustrates an exemplary difference resonance for any potential item state hyperpoint in a neural state space according to one embodiment.

FIG. 6 is a graph of equation 11, above, for an exemplary good hypertube 22 and bad hypertube 24, and shows the difference resonance for any potential item state hyperpoint in a neural state space 20. The calculated values for an entire two-dimensional hyperspace are shown as a surface plot, where the height of the surface represents the condition that corresponds to a particular item state hyperpoint. Assume that the hypercubes have the following prototypes:

$W\_GOOD\_1 = [0.2, 0.2, 0.78, 0.78]$ $W\_GOOD\_2 = [0.2, 0.7, 0.78, 0.28]$ $W\_BAD\_1 = [0.8, 0.8, 0.18, 0.18]$

Location 38-1 indicates the location of the W_GOOD_1 hypercube, location 38-2 indicates the location of the W_GOOD_2 hypercube, and location 38-3 indicates the location of the W_BAD_1 hypercube. Assume a current item state hyperpoint is derived based on a current item state point obtained from a selected item 12, and that the current item state hyperpoint is at a location 39. The Condition Rating axis indicates that the selected item 12 has a condition of approximately −0.45.

Figure 7:
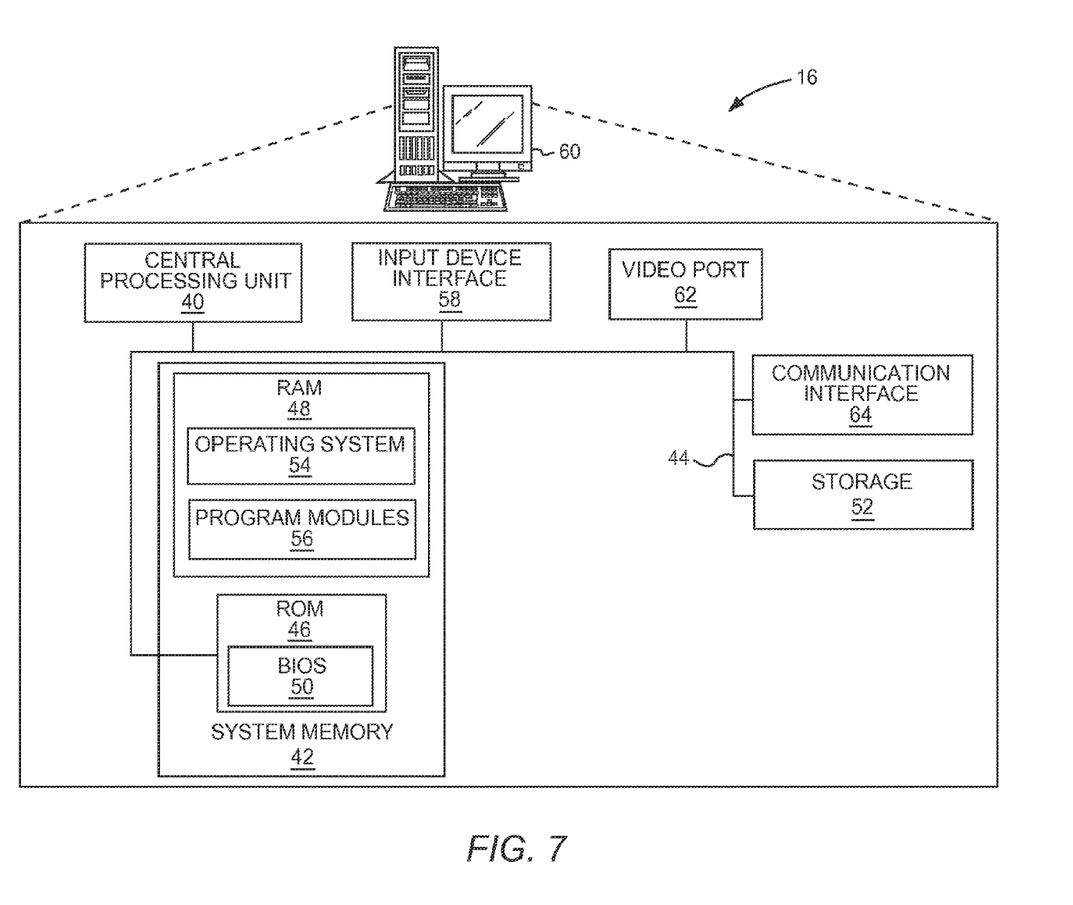
FIG. 7 is a block diagram of an exemplary computing device according to one embodiment.

FIG. 7 illustrates an exemplary device, such as a computing device 16, in which embodiments disclosed herein may be implemented. The computing device 16 may comprise, for example: a laptop computer; a desktop computer; a personal digital assistant (PDA); a workstation; a server; or any other computing device comprising a processor and capable of processing both data and suitable instructions to carry out the functionality described herein. The exemplary computing device 16 may include a processor, such as a central processing unit 40; a system memory 42; and a system bus 44. The system bus 44 provides an interface for system components including, but not limited to, the system memory 42 and the central processing unit 40. The central processing unit 40 can be any of various commercially available or proprietary processors. Dual microprocessors and other multi-processor architectures may also be employed as the central processing unit 40.

The system bus 44 may be any of several types of bus structures that may further interconnect to a memory bus (with or without a memory controller), a peripheral bus, and/or a local bus using any of a variety of commercially available bus architectures. The system memory 42 may include non-volatile memory 46 (e.g., read only memory (ROM), erasable programmable read only memory (EPROM), electrically erasable programmable read only memory (EEPROM), etc.) and/or volatile memory 48 (e.g., random access memory (RAM)). A basic input/output system (BIOS) 50 may be stored in the non-volatile memory 46, and can include the basic routines that help to transfer information between elements within the computing device 16. The volatile memory 48 may also include a high-speed RAM, such as static RAM, for caching data.

The computing device 16 may further include a storage device 52, which may comprise, for example, an internal hard disk drive (HDD) (e.g., enhanced integrated drive electronics (EIDE) or serial advanced technology attachment (SATA)) for storage, flash memory, or the like. The storage device 52 and associated computer-readable and computer-usable media provide non-volatile storage of data, data structures, computer-executable instructions, and so forth, such as the FuzzyART neural network 18. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage device 52 and in the volatile memory 48, including an operating system 54 and one or more program modules 56, which may implement the functionality described herein in whole or in part, including, for example, functionality associated with the FuzzyART neural network 18, such as the definitions of hypertubes and hypercubes, the determination of resonances, the quantification of conditions, and other processing and functionality described herein. It is to be appreciated that the embodiments can be implemented with various commercially available operating systems 54 or combinations of operating systems 54.

All or a portion of the embodiments may be implemented as a computer program product, such as a non-transitory computer-usable or computer-readable medium having a computer-readable program code embodied therein. The computer-readable program code can include complex software instructions for implementing the functionality of the embodiments described herein when executed on the central processing unit 40. The central processing unit 40, in conjunction with the program modules 56 in the volatile memory 48, may serve as a controller, or control system, for the computing device 16 that is configured to, or adapted to, implement the functionality described herein.

An administrator may be able to enter commands and information into the computing device 16 through one or more input devices, such as, for example, a touch-sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 40 through an input device interface 58 that is coupled to the system bus 44, but can be connected by other interfaces such as a parallel port, an IEEE 1394 serial port, a game port, a universal serial bus (USB) port, an IR interface, etc.

The computing device 16 may drive a separate or integral display device 60, which may also be connected to the system bus 44 via an interface, such as a video port 62. The computing device 16 preferably includes a communication interface 64 that is configured to communicate with a network, such as the network 26.

Those skilled in the art will recognize improvements and modifications to the embodiments of the present disclosure. All such improvements and modifications are considered within the scope of the concepts disclosed herein and the claims that follow.

What is claimed is:

1. A method for determining a condition of a selected item, comprising:
defining, by a computing device comprising a processor, a good hypertube in a neural state space, the good hypertube learned based on a plurality of good item state points obtained from at least one good item that exhibits desired characteristics, wherein the good hypertube comprises a plurality of good hypercubes, each good hypercube based on at least one good item state hyperpoint, the at least one good item state hyperpoint based on a good item state point of the plurality of good item state points;

defining, by the computing device, a bad hypertube in the neural state space, the bad hypertube learned based on a plurality of bad item state points obtained from at least one bad item that exhibits undesirable characteristics, wherein the bad hypertube comprises a plurality of bad hypercubes, each bad hypercube based on at least one bad item state hyperpoint, the at least one bad item state hyperpoint based on a bad item state point of the plurality of bad item state points, and wherein the good hypertube and the bad hypertube occupy less than a totality of the neural state space;

determining, by the computing device, a current item state hyperpoint in the neural state space based on a current item state point of the selected item; and quantifying the condition of the selected item as a function of a location of the current item state hyperpoint with respect to at least a portion of the good hypertube and with respect to at least a portion of the bad hypertube.

2. The method of claim 1, wherein quantifying the condition of the selected item as the function of the location of the current item state hyperpoint with respect to the at least the portion of the good hypertube and with respect to the at least the portion of the bad hypertube comprises quantifying the condition of the selected item as the function of the location of the current item state hyperpoint with respect to a first set of good hypercubes and with respect to a second set of bad hypercubes.

3. The method of claim 2, wherein the first set of good hypercubes comprises each good hypercube in the plurality of good hypercubes, and wherein the second set of bad hypercubes comprises each bad hypercube in the plurality of bad hypercubes.

4. The method of claim 2, wherein the first set of good hypercubes comprises each good hypercube within a hyperradius of the location, and wherein the second set of bad hypercubes comprises each bad hypercube within the hyperradius of the location.

5. The method of claim 2, wherein quantifying the condition of the selected item as the function of the location of the current item state hyperpoint with respect to the first set of good hypercubes and with respect to the second set of bad hypercubes comprises:

determining an aggregate good resonance of the current item state hyperpoint with respect to the first set of good hypercubes;

determining an aggregate bad resonance of the current item state hyperpoint with respect to the second set of bad hypercubes; and determining a difference resonance between the aggregate good resonance and the aggregate bad resonance, the difference resonance quantifying the condition of the selected item.

6. The method of claim 5, further comprising:

determining which particular resonance range of a plurality of resonance ranges the difference resonance falls within, each resonance range associated with a different condition; and indicating the condition of the selected item based on the particular resonance range.

7. The method of claim 1, wherein the plurality of good item state points is obtained from a plurality of good items that exhibit the desired characteristics over a period of time, and wherein the plurality of bad item state points is obtained from a plurality of bad items that exhibit the undesirable characteristics over the period of time.

8. The method of claim 1, wherein the good item state point represents a state of the at least one good item at a particular instant in time.

9. The method of claim 8, wherein the good item state point comprises at least one sensed attribute value.

10. The method of claim 9, wherein the good item state point comprises a plurality of sensed attribute values, and wherein the at least one good item state hyperpoint comprises a multi-dimensional vector, each dimension of the multi-dimensional vector corresponding to a particular sensed attribute value of the plurality of sensed attribute values.

11. The method of claim 1, further comprising providing a visual indicator of the condition of the selected item.

12. The method of claim 1, wherein each of the plurality of good item state points is based on a plurality of sensed attribute values obtained from the at least one good item, each sensed attribute value quantifying one sensed attribute of a plurality of sensed attributes, and each of the plurality of bad item state points is based on a plurality of sensed attribute values obtained from the at least one bad item, each sensed attribute value quantifying one sensed attribute of the plurality of sensed attributes, wherein determining the current item state hyperpoint comprises:

receiving, from a plurality of different sensors that sense the plurality of sensed attributes of the selected item, a plurality of sensed attribute values obtained from the selected item; and determining the current item state hyperpoint based on the plurality of sensed attribute values of the selected item.

13. A device, comprising:

a memory; and a processor coupled to the memory, the processor configured to:

define a good hypertube in a neural state space, the good hypertube learned based on a plurality of good item state points obtained from at least one good item that exhibits desired characteristics, wherein the good hypertube comprises a plurality of good hypercubes, each good hypercube based on at least one good item state hyperpoint, the at least one good item state hyperpoint based on a good item state point of the plurality of good item state points;

define a bad hypertube in the neural state space, the bad hypertube learned based on a plurality of bad item state points obtained from at least one bad item that exhibits undesirable characteristics, wherein the bad hypertube comprises a plurality of bad hypercubes, each bad hypercube based on at least one bad item state hyperpoint, the at least one bad item state hyperpoint based on a bad item state point of the plurality of bad item state points, and wherein the good hypertube and the bad hypertube occupy less than a totality of the neural state space;

determine a current item state hyperpoint in the neural state space based on a current item state point of the selected item; and quantify a condition of the selected item as a function of a location of the current item state hyperpoint with respect to at least a portion of the good hypertube and with respect to at least a portion of the bad hypertube.

14. The device of claim 13, wherein to quantify the condition of the selected item as the function of the location of the current item state hyperpoint with respect to the at least the portion of the good hypertube and with respect to the at least the portion of the bad hypertube, the processor is further configured to:
- determine a first resonance associated with a set of good hypercubes in proximity to the location;
- determine a second resonance associated with a set of bad hypercubes in proximity to the location; and
- quantify the condition of the selected item based on a function of the first resonance and the second resonance.

15. The device of claim 14, wherein the processor is further configured to determine the set of good hypercubes and the set of bad hypercubes based on a hyperradius.

16. The device of claim 14, wherein to quantify the condition of the selected item based on the function of the first resonance and the second resonance, the processor is further configured to determine a difference resonance between the first resonance and the second resonance, the difference resonance quantifying the condition of the selected item.

17. A method for determining a condition of a selected machine, comprising:
- determining, by a device comprising a processor, a current machine state hyperpoint in a neural state space based on current sensed attribute values of the selected machine; and
- quantifying, by the device, the condition of the selected machine as a function of a location of the current machine state hyperpoint with respect to at least a portion of a good hypertube comprising a plurality of good hypercubes, each good hypercube learned based on at least one good item state hyperpoint, the at least one good item state hyperpoint based on a good item state point obtained from at least one good item that exhibits desired characteristics and with respect to at least a portion of a bad hypertube comprising a plurality of bad hypercubes, each bad hypercube learned based on at least one bad item state hyperpoint, the at least one bad item state hyperpoint learned based on a bad item state point obtained from at least one bad item that exhibits undesirable characteristics by:
    - determining an aggregate good resonance of the current machine state hyperpoint with respect to a first set of good hypercubes;
    - determining an aggregate bad resonance of the current machine state hyperpoint with respect to a second set of bad hypercubes; and
    - determining a difference resonance between the aggregate good resonance and the aggregate bad resonance, the difference resonance quantifying the condition of the selected machine.

18. The method of claim 17, comprising iteratively determining the current machine state hyperpoint based on the current sensed attribute values of the selected machine, and for each iteration:
- quantifying the condition of the selected machine as a function of the current machine state hyperpoint with respect to the at least the portion of the good hypertube and with respect to the at least the portion of the bad hypertube; and
- presenting indicia on a display indicative of the condition of the selected machine.

\* \* \* \* \*